(No Model.) 3 Sheets—Sheet 1.
G. FUCHS.
DEVICE FOR COLLECTING CONTENTS OF CONTRIBUTION BOXES.
No. 604,527. Patented May 24, 1898.
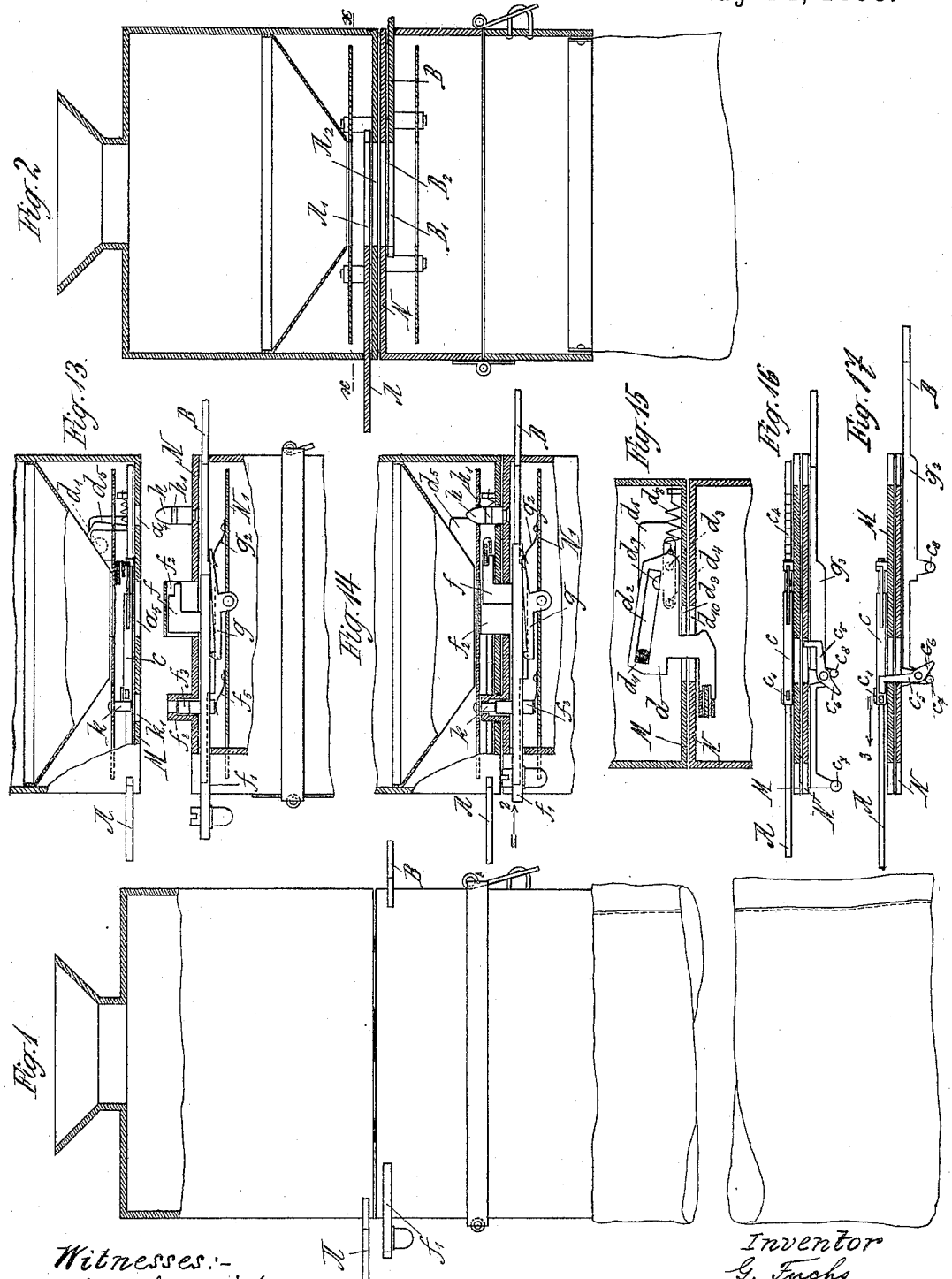
Witnesses:—
Alfred Meister
Heinrich Neubart
Inventor
G. Fuchs
by Eustace & Hopkins
Atty (No Model.) 3 Sheets—Sheet 2.
G. FUCHS.
DEVICE FOR COLLECTING CONTENTS OF CONTRIBUTION BOXES.
No. 604,527. Patented May 24, 1898.
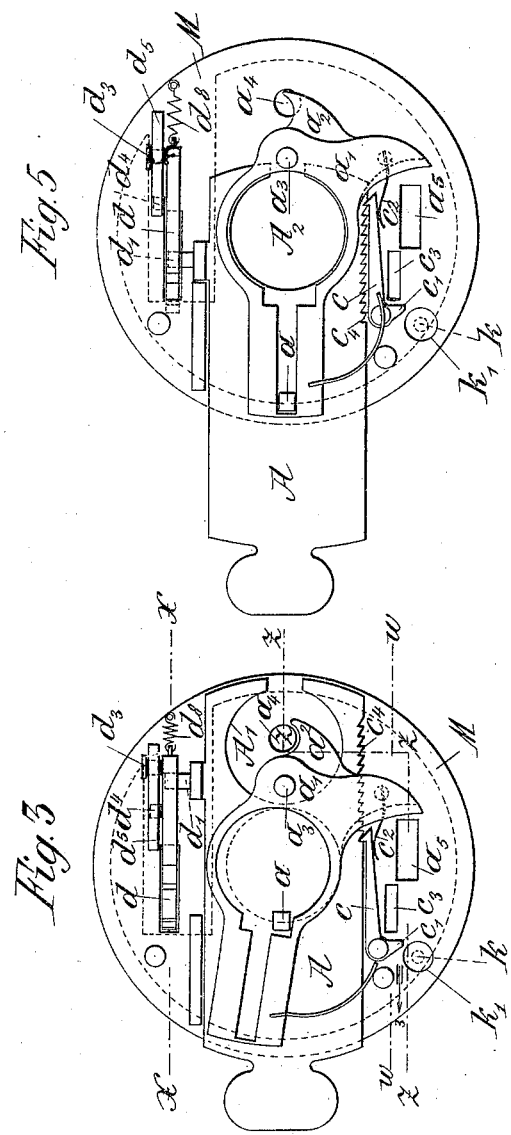
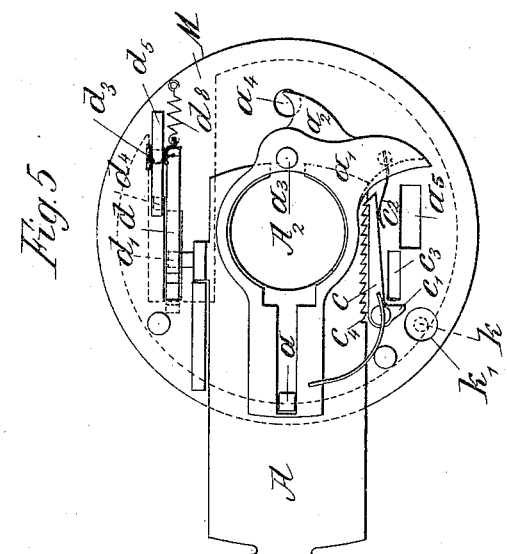
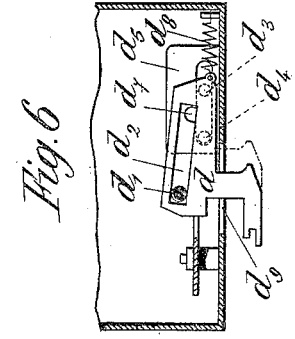
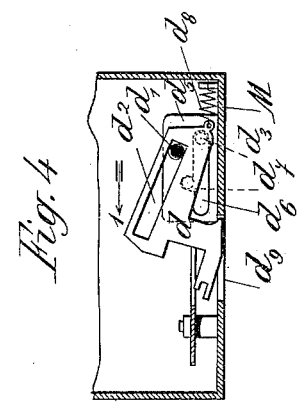

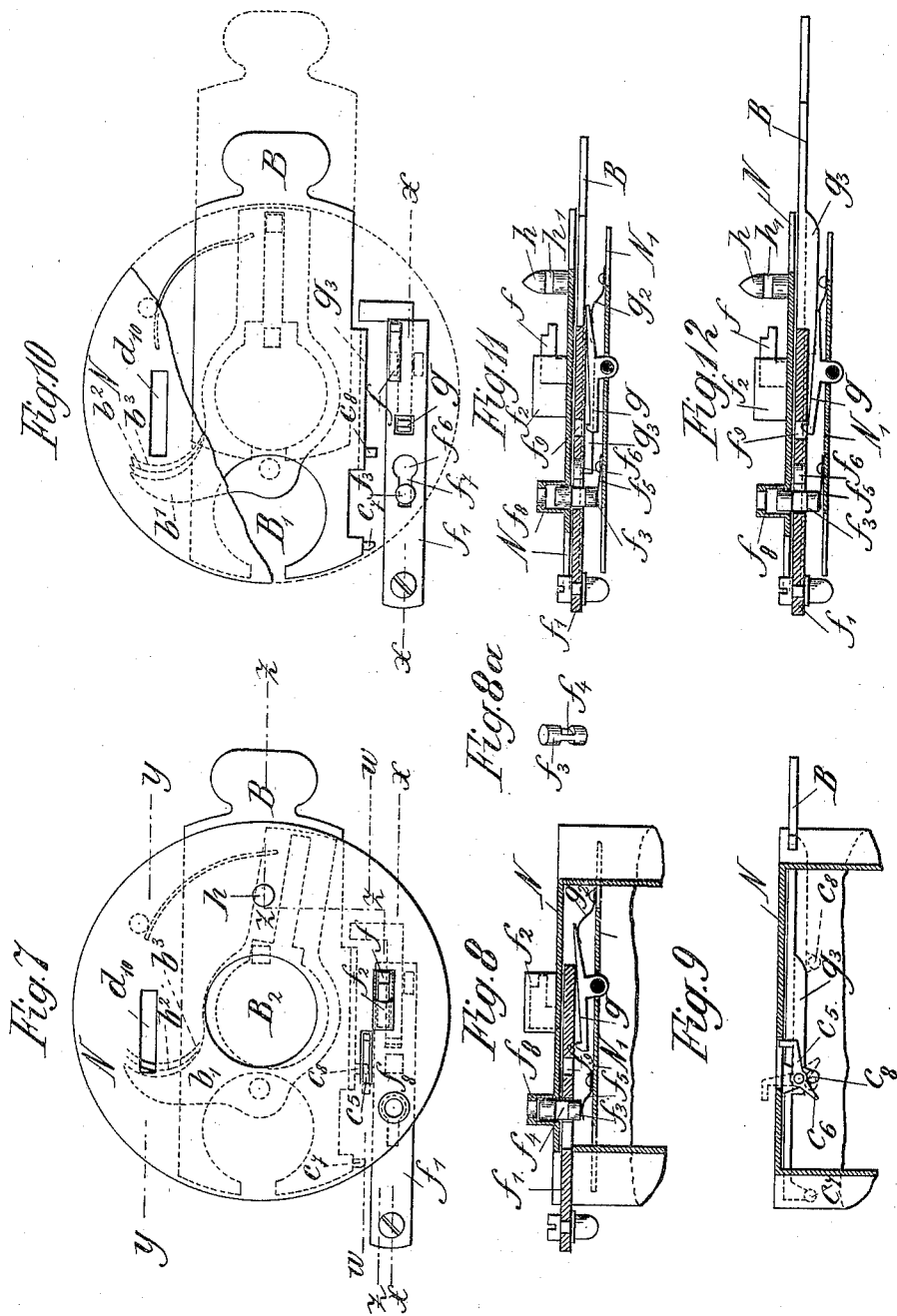

UNITED STATES PATENT OFFICE.

GUSTAV FUCHS, OF VIENNA, AUSTRIA-HUNGARY, ASSIGNOR TO MARTIN KOBLENZER, OF SAME PLACE.

DEVICE FOR COLLECTING CONTENTS OF CONTRIBUTION-BOXES.

SPECIFICATION forming part of Letters Patent No. 604,527, dated May 24, 1898.

Application filed March 26, 1897. Serial No. 629,408. (No model.)

*To all whom it may concern:*

Be it known that I, GUSTAV FUCHS, a subject of the Emperor of Austria-Hungary, residing at Vienna, Austria-Hungary, have invented a certain new and useful Improved Device for Collecting the Contents of Contribution-Boxes, of which the following is a full, clear, and exact description.

The present invention consists of a collecting-bag having a locking device thereon adapted to coöperate with engaging mechanism arranged on the contribution-boxes so as to enable the latter to be emptied consecutively into the collecting-bag without being opened—i. e., during the collection of the contents of various contribution-boxes into one collecting-bag neither the contents of the contribution-boxes nor those of the collecting-bag shall at any time be accessible to the collector—and in order to render the present specification more easily intelligible reference is had to the accompanying drawings, in which similar letters of reference denote similar parts throughout the several views.

Figure 1 is a side elevation of the contribution-box having the collecting-bag attached thereto. Fig. 2 is a central vertical section through the box and bag, in which the locking mechanism, with the exception of the slides, is omitted for the sake of greater clearness. Fig. 3 is a plan of the box mechanism, showing the covering-plate of the lock removed, said plan corresponding to a section on line $x\ x$ of Fig. 2; Fig. 4, a section on line $x\ x$ of Fig. 3. Fig. 5 is a similar view to Fig. 3 with the slide open. Fig. 6 is a similar section to that of Fig. 4 with the parts in the position occupied when the slide is in the position shown at Fig. 5. Fig. 7 is a plan of the head-plate of the collecting-bag in a closed and locked condition. Fig. 8 is a cross-section on line $x\ x$ of Fig. 7; Fig. 9, a cross-section on line $w\ w$ of Fig. 7. Fig. $8^a$ is a detail view of the double-recessed pin $f^3$. Fig. 10 is a similar plan to Fig. 7, showing the head-plate partially broken away and the actuating-bolt in operative position. Fig. 11 is a vertical section through the line $x\ x$ of Fig. 10. Fig. 12 is a similar section with the bag-closing plate opened in the position indicated by dotted lines in Fig. 10. Fig. 13 is a section through the contribution-box and the collecting-bag, said section being on the lines $z\ z$ of Figs. 3 and 7, respectively. Fig. 14 shows the box and bag in the united position in similar sections to those of Fig. 13. Fig. 15 is a section on the lines $x\ x$ of Fig. 3 and $y\ y$ of Fig. 7 after the two parts have been united and the closure of the box drawn out. Fig. 16 is a section on line $w\ w$ of Figs. 3 and 7 before the closing-slides of the box and bag are drawn out, and Fig. 17 shows a similar section after the closing-lids have been drawn out.

The circular bottom M of the contribution-box, which for the purposes of this specification will be called the "box," while the collecting-bag will be styled simply "bag," is provided with a circular orifice $A^2$ and with a slide A, also having a circular orifice $A'$ and adapted to close the orifice $A^2$ with its full part. The slide A is locked in the position in which it closes the box-bottom by means of a series of tumblers $a'\ a^2$ and a tumbler-pin $a$, which extends through slots in the said tumblers. The tumblers $a'\ a^2$ are provided at the rear of their pivot $a^3$ with hooked extensions, which when the box is closed lie sideward of a slot $a^5$ in the bottom M of the box. Through this slot $a^5$, when the bag is attached to the box, a bolt passes, which may be slid over the bottom M and engages the tumbler extensions and allows the slide A to be released. After this has taken place the slide A can be drawn out into the position shown at Fig. 5 and will be retained in this position by means of a pawl $c$, having a spring $c^2$ and engaging a rack $c^4$.

The slide A can only be moved back to close the box after the pawl $c$ has been disengaged from the rack $c^4$ by pressure having been applied to the short arm $c'$ of the same. At the side of the slide A a vertical plate $d^5$ is mounted on the bottom of the box, said plate having a horizontal slot $d^6$ and a short semicircular recess formed at the top of said slot, as at $d^7$. The guide-pins $d^3\ d^4$ of a bolt $d$ are guided in the said slot $d^6\ d^7$, said bolt $d$ being normally held in the position shown at Fig. 4 by means of the spring $d^8$. The bolt $d$ is further provided with a slot $d^2$, in which a pin $d'$ of the slide A engages. When the slide is drawn out, the pin $d'$ moves in the slot $d^2$ in the direction of the arrow 1, Fig. 4, depressing the bolt $d$ by means of the slanting direction of the said slot, as will be evident. Thus the bolt $d$ will first be moved in the arc of a circle having its center at the pin $d^3$ and will be brought into the position shown in dotted lines in Fig. 6. When it has gained this position, the pin $d'$ of the slide A will have reached the end of the slot $d^2$ and the pin $d^4$ will be in the horizontal part of the slot $d^6$, so that further movement of the slide A will pull the bolt $d$ in a horizontal direction against the pressure of its spring $d^8$. The bottom M of the box is provided with a circular hole $k'$, above which a vertically downwardly extending pin $k$ is suspended from the plate covering the parts of the lock. (Best seen in the upper part of Fig. 13.) The bottom M is further provided with a hole $a^4$, situated so as to be partially covered by the tumbler $a^2$ when the latter is disengaged and the slide A drawn out.

The bag is provided with a head N, having an orifice $B^2$, corresponding in position to that $A^2$ of the bottom M and having a slide B, provided with a corresponding orifice $B'$. The slide B, Figs. 7 and 10, is locked in the position to keep the opening of the head closed by means of a series of tumblers $b'$ $b^2$ $b^3$, capable of being disengaged by means of the bolt $d$, which passes through the slot $d^{10}$ of the head N. At one of the longitudinal sides of the slide B two stops $c^7$ $c^8$ are arranged, Fig. 9, said stops being adapted to engage a bell-crank lever shortly before the end of the stroke of the slide and turn the same around ninety degrees, said angle-lever being mounted on the head N of the sack and having its upwardly-extending arm flush with the surface of the head when the slide is closed and being thrown upwardly by the stops when the slide B is drawn out into the position shown in dotted lines in Fig. 9, so as to engage a slot $c^3$ in the bottom M of the box and lock the bottom M and head N together.

A slide $f'$ is arranged below the head N, which carries a bolt $f$, extending through the said head, said bolt being incased when in its position of rest within a housing $f^2$, Figs. 7 and 8, mounted on the head-plate. The slide $f'$ is retained in its inward position by means of a pin $f^3$, which rests on a flat spring $f^5$, mounted on the lower plate N', which is suitably supported on the head-plate N. This pin extends through the hole $f^6$ of the slide $f'$ and upwardly through the plate N into a sleeve $f^8$, mounted on the latter. The pin $f^3$, Fig. 8$^a$, is recessed at both sides at a point corresponding to the plane of movement of the slide $f'$, so that the slotted elongation $f^7$ of the circular orifice $f^6$ can pass along the said pin at this point when the said recesses are in the plane of movement of the said slide. Normally the pin $f^3$ is retained in a position with the recesses above the plane of motion of the slide $f'$, so that the latter cannot be withdrawn. Thus if the pin $f^3$ should be depressed, so as to bring the recesses into the plane of motion of the slide, the latter can be pushed in. In order to retain the slide $f'$ in its inward position, a pawl $g$ is mounted on the plate N', Figs. 8 and 12, which is kept out of engagement with the slide by means of a spring $g^2$ and which only engages the slide when the slot $f^9$ of the same is above the hook of the pawl and when the latter has been depressed against its spring action by suitable means.

A cam-surface is mounted on the slide B at $g^3$, and when this slide is drawn out it engages the end of the pawl $g$ and raises the hooked end of the same, which engages the opening $f^9$ of the slide $f'$ and retains the same in position. If the slide B is pushed in, the pawl will be released and leaves the orifice $f^9$, owing to the pressure of its spring in the other direction. The head N is further provided with an upwardly-extending pin $h$, having lateral recess $h'$, which engages the orifice $a^4$ of the box-bottom M when the head and bottom are fitted one against the other.

I will now proceed to describe the manner in which the parts of the apparatus are fitted together and taken apart when it is required to empty a contribution-box into the collecting-bag.

The slides A and B of the box and bag are retained closed as long as the two surfaces are not fitted together. The head of the bag is placed against the bottom of the box, as shown at Fig. 1. In this position the housing $f^2$ of the bolt $f$ enters the slot $a^5$ of the plate M, the sleeve $f^8$ of the head N passes into the orifice $k'$ of the plate M, the slot $d^{10}$ of the head N corresponds with the slot $d^9$ of the bottom M, and the slot $c^3$ is in position to receive the lever $c^5$. (See Figs. 13 and 14, in which the tumblers are shown in section for the sake of greater clearness.) On placing the parts together in this manner the pin $k$ of the bottom M of the box will enter the sleeve $f^8$ of the head and depress the pin $f^3$, so as to bring its recesses into the plane of movement of the slide $f'$ and permit the latter to be pushed in the direction indicated by the arrow 2, Fig. 14, and occupy the position shown in Figs. 10, 11, 12, and 14. The motion of the slide $f'$ causes the end of the bolt $f$ to be projected from its housing $f^2$, Fig. 14, and its end contacts with the tumblers $a'$ $a^2$ of the slide A, turning the same on their pivot and bringing their slots in front of the stop $a$ of the slide A and causing the rearward projection of the tumbler $a^2$ to enter the recess $h'$ of the pin $h$, mounted on the head N, thus locking together the box and bag. The hooked end of the bolt $f$ having also passed over the plate M, the two parts are doubly locked. Owing to the disengagement of the tumblers the plate A may now be drawn out into the position shown at Fig. 2, in which position it is arrested by means of the pawl $c$. In Fig. 2 the slides A and B only are shown for the sake of greater clearness. This motion of the slide A causes the bolt d to be first depressed and then moved laterally, by which movement it contacts with the tumblers $b'$ $b^2$ $b^3$ of the slide B, releasing the same from their retaining-pin and allowing the said slide B to be withdrawn, as shown at Fig. 2. This movement of the slide B causes the stop $c^7$ to contact with the arm $c^6$ of the angle-lever $c^5$ $c^6$ and turn the same into the position shown at Fig. 17, in which position it contacts with and turns the arm $c'$ of the pawl $c$ in the direction of the arrow 3, so that the said pawl will be disengaged from the rack $c^4$, and the slide A may be returned to its normal position when the box is closed. The movement of the slide B further locks the bolt $f$ in its position over the bottom of the box in that the pawl end of pawl $g$ is depressed by the cam-surface $g^3$ on the slide B, and the hook of the pawl enters the orifice $f^9$ of the slide $f'$, preventing the return of the slide to its initial position. In this position of the parts the orifices of the slides A and B and of the bottom and head M and N coincide and the contents of the contribution-box may fall into the collecting-bag. When this has taken place, the slide B is returned to its initial position, as also the slide A and the slide $f'$, where they are arrested in the manner previously described. The box and bag may now be separated, and each will be closed and locked before the separation can take place.

The present invention combines many advantages. Thus neither of the tumbler-operating bolts are visible from without, the bolt $d$ being inclosed within the housing or casing and the bolt $f$ being within its housing $f^2$, from which it can only project after the pin $f^3$ has been depressed. Then, again, when the box and bag have been fitted together and the slide A pulled out even a very little distance it will be necessary to pull out the slide B before the slide A can be released; otherwise the bag cannot be removed from the box. Thus supposing any one should get acquainted with the operation of the mechanism he would only be able to open a box once, because it would not be possible to reclose the box after the slide had been opened.

I claim as my invention—

1. The combination of a box having orifice and closure-slide as specified and a bag having a head-plate with corresponding orifice and closing-slide, a series of tumblers in connection with both said slides, to retain the same locked, a slide-bolt $f'$ mounted beneath said head-plate and having a circular orifice therein with lineal slotted elongation, a vertically-guided pin $f^3$ to fit said circular orifice and having flattened sides at a point in its length, to fit said elongation, means for retaining said bolt with its circular part in the circular orifice, when the box and bag are apart and means in connection with the box-bottom for depressing said bolt as specified when the box and bag are united, a hooked bolt $f$ on said slide-bolt, extending through the head-plate and adapted to engage over the bottom of the box when the slide-bolt is operated, and to free the tumblers of the box-slide as specified, a sliding hooked bolt $d$ mounted on the bottom of the box and means in connection with the slide of the box to impart to said bolt a downward and then a horizontal motion when the said slide is opened, an orifice in the head-plate through which the bolt $d$ extends, said bolt constituting the means for operating the tumblers of the bag-slide on the movement of the box-slide, a pawl-and-ratchet device to lock the box-slide in its open position, a pawl operated by the bag-slide to lock the slide-bolt $f'$ in its operative position when the bag-slide is opened and a tumbler-lever mechanism in the bag-head plate, adapted to be operated by the bag-slide and to extend into the box-bottom and release the box-slide-retaining pawl when the bag-slide has been opened, substantially as described.

2. The combination of a box having an orifice in the bottom and a slide to close said orifice, a bag having corresponding head-plate and orifice and closing-slide as specified, an operating-bolt slide to lock the box and bag together and release the lock of the box-slide as specified, a series of tumblers to lock the bag-slide, an orifice in the bag-head in proximity to said tumblers, a sliding bolt $d$ mounted in the box-bottom, a guide-plate $d^5$ for the same having slot $d^6$ with upwardly-extending semicircular arm $d^7$, pins on the bolt $d$ to travel in said slot, a slanting slot in the said bolt $d$ and a pin on the slide of the box to engage said slot, a returning-spring to said bolt and means for locking and releasing the slides and the operating-bolt in the order specified and for locking the box to the bag-head while the slides are open and releasing the parts when the slides have been closed and locked substantially as described.

3. The combination of a box having orifice and closing-slide and means for normally keeping said closing-slide locked consisting of a series of tumblers, a bag having corresponding orifice and head-plate in which said orifice is formed and a closing-slide and lock to the same and having an operating-bolt normally locked by means of a pin as specified, means in connection with the box-bottom to release said pin when the box and bag are united and a hooked bolt on said slide-bolt to engage the tumblers of the box-slide, a rearwardly-extending projection on one of said tumblers and an orifice $a^4$ in the box-bottom in proximity to said tumbler projection and adapted to be partially closed by said projection when the tumblers are in the position to release the slide, a pin on the bag-plate to extend into said orifice $a^4$ and having lateral recess into which the tumbler projection passes to retain the bag and box together when the slide of the box has been released, and means for locking and unlocking the parts in the order specified, substantially as described.

4. The combination of a box having orifice in the bottom and having slide to close same with locking mechanism as specified, a bag having corresponding orifice in its head-plate and locking means in connection with its closure-slide all as specified, an operating slide-bolt and means in connection therewith to release the tumblers of the box-slide, a vertically and horizontally movable bolt $d$ mounted in the box-bottom and means in connection with the box-slide for projecting the same into the bag-head as specified, a row of ratchet-teeth formed in the side of the slide A of the box within the box and a pawl $c$ having spring $c^2$ and rearwardly-extending arm $c'$ to engage said ratchet-teeth and retain the slide in its outward position, an orifice in the box-bottom in proximity to said pawl, a tumbler-lever mounted beneath the bag-head plate and an orifice in said bag-head above said tumbler-lever and means in connection with the bag-slide to project said tumbler-lever through the box-bottom and release the pawl of the slide of the box substantially as described.

5. The combination of a box having orifice in the bottom and closing-slide with locking means and a bag having head-plate with corresponding orifice and locking means for the closing-slide beneath said head-plate as specified an operating slide-bolt $f'$ and means in connection therewith for locking together the box and bag and for releasing the lock of the slide of the box, means in connection with the box-slide to release the bag-slide, a pivoted pawl $g$ mounted beneath the bag-head and below the operating slide-bolt, and orifice in said slide-bolt adapted to be brought over the pawl-hook when the operating slide-bolt is pushed in as specified, a cam-surface beneath the slide of the bag and fast on the same adapted to contact with the pawl end and operate the pawl to engage the said slide-bolt orifice when the bag-slide is drawn out and means for locking and unlocking the parts in the order specified for the purpose substantially as described.

In testimony whereof I have signed my name to this specification in the presence of two subscribing witnesses.

GUSTAV FUCHS.

Witnesses:
HARRY BELMONT,
BURGHARDT ALFONS.